United States Patent
Beck (10) Patent No.: US 10,567,681 B2
(45) Date of Patent: Feb. 18, 2020

(54) MULTI-LINE DETECTION METHOD

(71) Applicant: Carl Zeiss Microscopy GmbH, Jena (DE)

(72) Inventor: Martin Beck, Jena (DE)

(73) Assignee: Carl Zeiss Microscopy GmbH, Jena (DE)

( * ) Notice: Subject to any disclaimer, the term of this patent is extended or adjusted under 35 U.S.C. 154(b) by 76 days.

(21) Appl. No.: 15/580,417

(22) PCT Filed: Jun. 3, 2016

(86) PCT No.: PCT/EP2016/062638
§ 371 (c)(1),
(2) Date: Dec. 7, 2017

(87) PCT Pub. No.: WO2016/202611
PCT Pub. Date: Dec. 22, 2016

(65) Prior Publication Data
US 2018/0191970 A1    Jul. 5, 2018

(30) Foreign Application Priority Data
Jun. 17, 2015 (DE) .................. 10 2015 109 645

(51) Int. Cl.
*H04N 5/353* (2011.01)
*G02B 21/06* (2006.01)
(Continued)

(52) U.S. Cl.
CPC .......... *H04N 5/3532* (2013.01); *G02B 21/06* (2013.01); *G02B 21/365* (2013.01); *H04N 5/2354* (2013.01); *H04N 5/341* (2013.01)

(58) Field of Classification Search
None
See application file for complete search history.

(56) References Cited

U.S. PATENT DOCUMENTS

2006/0017001 A1   1/2006  Donders et al.
2007/0273785 A1  11/2007  Ogawa et al.
(Continued)

FOREIGN PATENT DOCUMENTS

DE   10 2010 013 223 A1   9/2011
DE   10 2011 114 500 A1   4/2013
(Continued)

OTHER PUBLICATIONS

International Preliminary Report on Patentability of the International Application No. PCT/EP2016/062638 dated Dec. 19, 2017 and Written Opinion of the International Searching Authority.
(Continued)

*Primary Examiner* — Chikaodili E Anyikire
(74) *Attorney, Agent, or Firm* — Duane Morris LLP (57) ABSTRACT

A method for multi-line detection, in which a number M of regions $R_m$ to be read, with m=1, ..., M, is specified on a two-dimensional detector connected to an actuator. In each region to be read, a number J of row groups in each case of adjacent detector rows is specified, wherein each row group comprises a predefined number N of detector rows. In order to be able to record light in several areas on the detector at the same time, integration process are started successively in all participating rows and, after these have been ended, read processes are started. A read time is available for the reading of each row, this read time also corresponds to the temporal offset in which the integration processes are started row by row. An actual exposure, controlled via a corresponding signal, is effected only when integration processes have actually been started in all participating rows and the first integration process has not yet been ended again. In this way, a simultaneous detection in different areas on the sensor under identical conditions is possible.

13 Claims, 3 Drawing Sheets

(51) Int. Cl.
*G02B 21/36* (2006.01)
*H04N 5/235* (2006.01)
*H04N 5/341* (2011.01)

(56) References Cited

U.S. PATENT DOCUMENTS

| | | | |
|---|---|---|---|
| 2012/0200693 A1* | 8/2012 | Lippert | G02B 21/002 348/79 |
| 2013/0076952 A1* | 3/2013 | Shi | H04N 5/2354 348/308 |
| 2013/0093873 A1 | 4/2013 | Bula et al. | |
| 2013/0129212 A1 | 5/2013 | Fomitchov et al. | |
| 2014/0313576 A1 | 10/2014 | Uhl et al. | |
| 2015/0131050 A1 | 5/2015 | Bublitz et al. | |
| 2016/0327779 A1* | 11/2016 | Hillman | G02B 21/367 |

FOREIGN PATENT DOCUMENTS

| | | |
|---|---|---|
| DE | 10 2012 020 241 A1 | 4/2014 |
| WO | WO 2011/120629 A1 | 10/2011 |
| WO | WO 2014/056990 A1 | 4/2014 |
| WO | WO 2014/140256 A2 | 9/2014 |
| WO | WO 2015/109323 A9 | 7/2015 |

OTHER PUBLICATIONS

International Preliminary Report on Patentability of International Application No. PCT/EP2016/062638 dated Dec. 19, 2017 & Written Opinion of the International Searching Authority.
Baumgart, Eugene, et al., "Scanned light sheet microscopy with confocal slit detection", *Optics Express* 2012, 20(19):21805-21814.
Mei, E., et al., "A line scanning confocal fluorescent microscope using a CMOS rolling shutter as an adjustable aperture", *Journal of Microscopy* 2012, 247(3):269-276.
Yang, Zhe, et al., "Dual-slit confocal light sheet microscopy for in vivo whole-brain imaging of zebrafish", *Biomedical Optics Express* 2015, 6(5):1797-1811.
German Search Report of Germany Priority Application (10 2015 109 645.5).
International Search Report of the International Application (PCT/EP2016/062638).

* cited by examiner

MULTI-LINE DETECTION METHOD

RELATED APPLICATIONS

The present application is a U.S. National Stage application of International PCT Application No. PCT/EP2016/062638 filed on Jun. 3, 2016 which claims priority benefit of German Application No. DE 10 2015 109 645.5 filed on Jun. 17, 2015, the contents of each are incorporated by reference in their entirety.

FIELD OF THE INVENTION

The invention relates to a method for multi-line detection. In the state of the art, methods are known in which for example a specimen is illuminated with a moving illumination line and light emitted by the specimen is detected by a rolling shutter camera. The movement of the rolling shutter in the image plane is synchronized with the movement of the image of the illumination line. The term "rolling shutter" means that not all lines of an area on an image sensor are exposed simultaneously, i.e. integrated, and then read, but the exposure is effected for example row by row, or area by area for groups of rows. Two-dimensional detectors suitable for this purpose are for example CMOS sensors. When rolling shutter exposure is used in microscopic imaging methods, as a rule the optical magnification ratios are arranged such that the height of the pixel rows acts like a confocal aperture. In this way, the resolution in axial direction can be increased or the contrast in the image can be increased, as light which is emitted in front of and behind the focal plane in the direction of the detection lens system no longer contributes to the image content.

STATE OF THE ART

A microscope based on rolling shutter technology is for example the "DLM Confocal Microscope™" from AEON Imaging LLC which can detect in transmission at different angles.

In DE 10 2010 013 223 A1 a microscopy method is described in which a specimen is irradiated with excitation light focussed thereon and a specimen region is imaged onto a two-dimensional detector by means of a corresponding detection lens system, wherein illumination direction and detection direction—as is usual for example in light sheet microscopy—form an angle different from zero, for example 90°. The two-dimensional detector is actuated such that the active surface is restricted to a read area which comprises the projection of the focus of the excitation light and when the focus is shifted the active surface is adapted to this shift, with the result that the shifted active surface again comprises the projection of the focus of the excitation light. In particular, this method can be used when the excitation light is irradiated into the specimen volume from different devices in two time intervals. In the case of the active area, shape, length and/or width on the detector surface can be set. The restriction of the active surface is effected in rolling shutter operation. If only a single illumination line is used, the use of a single rolling shutter is sufficient, however there are limits to the application of this method as relatively long exposure times per row are necessary in order to obtain a sufficient signal-to-noise ratio; this results in relatively long image acquisition times, which are too long for some types of experiment however, as well as in a low refresh rate.

In the state of the art, so-called split sensors are also known, which are composed of two areas separate from each other which can be actuated and read independently of each other. They have two actuator bus systems and two read cascades etc. Strictly speaking, split sensors are not single sensors but two sensors. In the following, the term "sensor" is therefore used to denote in each case a sensor with a bus system and a single read cascade.

DESCRIPTION OF THE INVENTION

The object of the invention is therefore to develop a method with which a multi-line detection can be established in the manner of a rolling shutter on a single sensor, with the result that for each of the lines used the detector is exposed in rolling shutter mode, whereby the image acquisition time is shortened overall and in this way the refresh rate can be increased.

This object is achieved by a method for multi-line detection which comprises the following steps.

In a step a) a number M of regions $R_1, R_2, \ldots, R_M$ to be read, with a natural number $M \geq 1$, is specified on a two-dimensional detector, connected to an actuator, which comprises a number of detector rows, each region to be read comprising at least one detector row. The regions $R_m$ to be read, with $m=1, \ldots, M$, define the areas on the two-dimensional detector, for example a CMOS sensor, in which in each case operation is in rolling shutter mode. If for example M=3, three regions $R_1, R_2, R_3$ to be read are specified and in each of the three regions the exposure is effected in the manner of the rolling shutter method. The regions $R_m$ to be read each comprise at least one detector row, but as a rule several detector rows, wherein the regions to be read on the sensor surface in each case comprise different, non-overlapping, areas of detector rows. Actuation is easiest if each of the regions $R_m$ to be read comprises the same number of detector rows, but this is not absolutely necessary, and, depending for example on the examination method chosen, the regions $R_m$ to be read can also comprise different numbers of detector rows.

In a next step b), in each region $R_m$ to be read, a number J of row groups $G_{m1}, G_{m2}, G_{mJ}$, with a natural number $J \geq 1$, in each case of adjacent detector rows is specified. Each row group $G_{mj}$ comprises a number N of detector rows $Z_{mj1}, Z_{mj2}, \ldots, Z_{mjN}$, with $j=1, \ldots, J$ and $N \geq 1$. These row groups $G_{mj}$ in each case define so-called apertures which, although they are adjacent in respect of their rows in a region $R_m$ to be read, can be exposed at different times, i.e. for which an integration process is started at different times.

In a third step c), in order to start a first detection process, i.e. when $j=1$, a level trigger signal LTS is set from "0" to "1". The values "0" and "1" are chosen at random here and are to symbolize only that the level trigger signal LTS can assume two different values which can be set for example by a low voltage ("low") and a higher voltage ("high"). An integration process is thereby triggered for the first detector row $Z_{111}$ of the first row group $G_{11}$ in the first region $R_1$ to be read during a first integration time $t^b_1$. At the end of this, the level trigger signal is set from "1" back to "0". The integration process and the first detection process are ended and a read process is started, wherein during a first read time $t^a_1$ the exposure value detected for this detector row $Z_{111}$ is read and conveyed to an evaluation unit. The evaluation unit can for example be an image-processing unit, which can also be integrated into a camera of which the detector is a part. The detection process is thus controlled, i.e. started and ended, by setting the level trigger signal LTS. The first read time is composed of at least two values $t^a_1 = t^r_1 + t^o_1$, wherein $t^r_1$ is the actual read time physically required for the transfer of the accumulated charge, including the determination of a digitized value allocated to the charge, and $t^o{}_1$ defines a user delay time which can be freely chosen by the user and with which the read process can be started or ended depending on whether the user delay time is added before or after the actual reading.

The level trigger signal must only be set to "1" for the first detector row $Z_{111}$ because in a fourth step d) by means of an actuator logic—the actuator logic is either part of the sensor or integrated separately in a specific circuit into the detector or a camera with the detector—integration processes with subsequent reading are triggered successively, temporally offset in each case by the distance of the first read time $t^a{}_1$ in the further detector rows of the first row group $G_{11}$ and then correspondingly in the first line groups $G_{m1}$ of the remaining regions $R_m$ to be read for m–1=1, . . . , M–1, wherein the read process—started with the reading of the first row $Z_{111}$—is ended once the last row $Z_{M1N}$ of the first row group $G_{M1}$ of the last region $R_M$ to be read has been read. The integration processes and the reading of individual rows are thus started automatically within this cascade, i.e. by a corresponding finite-state machine.

Depending on the control system and the hardware used it is alternatively also possible in step d) to shorten or completely avoid this period in which the integration processes are started by triggering the integration processes at least almost simultaneously with the starting of the first detection process in the further detector rows of the first row group ($G_{11}$) and the further first row groups ($G_{m1}$) of the remaining regions ($R_m$) to be read for m–1=1, . . . , M–1. This increases the efficiency of the exposure, as the period of time in which all rows in the respective detection process are switched to integration can be extended.

In a fifth step e), after the integration process of the first row group $G_{11}$ in the first region $R_1$ to be read has been ended, J–1 further detection and read processes are started successively by carrying out steps c) and d) for the further row groups $G_{mj}$, with j–1=1, . . . , J–1, and with further integration times $t^b{}_1$ and further read times $t^a{}_j$. At the start, the signal LTS is set to 1 again—outside the detector or camera—this trigger signal is set from outside the detector or camera, i.e. as a rule not by the actuator logic of the camera. The integration times can deviate from the times $t^b{}_1$ and $t^a{}_1$ given in step c). A distinct group of rows is assigned to each detection process j.

In the second detection process, with j=2, the integration process for the first row $Z_{121}$ of the second row group $G_{12}$ in the first region $R_1$ to be read is not started until the integration process for the last row $Z_{11N}$ of the row group $G_{11}$ in the same region $R_1$ to be read has been ended, etc. , with the result that in the same region $R_m$ to be read integration processes are effected separated into row groups j and simultaneously only in this row group, and integration processes are not carried out simultaneously for two row groups j, j+1 in the same region $R_m$ to be read. The in each case further detection process j+1 must not be effected directly after the end of the last integration process of the previous row group j, but, depending on external boundary conditions, a longer period of time of for example over several milliseconds or seconds can also be interposed in which no detection process proceeds in the respective region $R_m$ to be read.

Whereas in the state of the art a detection process in rolling-shutter mode is always completed in only one region to be read, the procedure according to the invention allows parallel detection in several regions to be read of a sensor— as defined at the outset—at the same time. This can, of course, also be transferred to split sensors, a correspondingly higher degree of parallelization is then possible here.

The small temporal offset as a result of the rolling shutter operation—due to the fact that in a commonly actuated region of the sensor in which the pixels are connected to a common bus only one row can be read at a time—can however lead to errors in the result, for example to geometric distortions of moving specimens and to non-matching overlays in an image which is composed of spectrally separate individual images taken in succession, in particular when live specimens are involved. In addition, if the maximum exposure time for each row group, i.e. from the start of the first detection process of the first line in this group to the end of the corresponding detection process of the last line of this group, is used, this can lead to an undesired bleaching of the specimen.

In a preferred embodiment of the method, an exposure of the detector is therefore effected during the integration time in each detection process for j=1, . . . , J only when an integration process proceeds at the same time for the rows of all participating row groups $G_{mj}$, i.e. all rows, participating in a detection process, of all row groups $G_{mj}$ are switched to integration or detection, i.e. are made photosensitive. Depending on the integration time and the read time, which are identical for the participating row groups $G_{mj}$ when j is fixed, in order to guarantee uniform detection conditions, the time that is actually available for simultaneous exposure of all participating rows can thus be much shorter than the integration time. Thus, for example, the longer the read time per row is, the shorter the time actually available for simultaneous exposure when the integration time is fixed becomes. In this way, on the one hand the exposure time and thus the risk of bleaching the specimen is minimized, on the other hand geometric distortions and image errors caused by non-matching overlays are also avoided.

In a preferred embodiment of this variant, in each detection process j for j=1, . . . , J the exposure is controlled by means of an illumination signal IS which is usually generated by the actuator logic of the sensor or a camera. The illumination signal IS is set to "1" during the respective, j-th detection process for a row when the integration process is started for the last detector row $Z_{MjN}$ of the corresponding j-th row group Gm of the last region $R_M$ to be read. The illumination signal IS is set to "0" simultaneously with the level trigger signal LTS, wherein an exposure of the two-dimensional detector is only effected while the illumination signal is set to "1". The illumination signal IS can be used for example to control an element arranged upstream of the detector—for example an acousto-optic modulator—which assumes the function of a global shutter for the detector and to open this shutter only when the illumination signal IS is set to "1". The specimen illumination can also be controlled via the illumination signal IS in order to keep the load on the specimen caused by light irradiation as small as possible.

For the alternative case in step d), in which the integration processes are started simultaneously or almost simultaneously, the exposure need not be controlled separately by means of an illumination signal IS, the exposure is effected in time with the signal LTS, i.e. it begins when the signal LTS is set to "1" and ends when the signal LTS is set to "0".

In a further preferred embodiment, which can of course be combined with the above-named embodiments and subsequent embodiments still to be named, in the case of the first alternative, with successively starting integration processes, the subsequent detection process—in the case of a detection process j the subsequent detection process is (j+1)—is not started until, in the immediately preceding detection process—thus the detection process j—the integration process for the last row $Z_{1jN}$ of the first row group $G_{1j}$ of the first region $R_1$ to be read has been completed, or in the case of the second of the alternatives, with at least almost simultaneously starting integration processes, the integration process for the last row $Z_{1MN}$ of the first row group $G_{Mj}$ of the last region $R_N$ to be read. Particularly preferably, in each detection process j=1, ..., J, when the integration process has been completed—in the case of the first alternative for the last row $Z_{1jN}$ of the first row group $G_{1j}$ of the first region $R_1$ to be read and in the case of the second alternative for the last row $Z_{1MN}$ of the first row group $G_{Mj}$ of the last region $R_N$ to be read—an overlap margin signal OMS is generated by the actuator logic of the camera or the sensor and transmitted to the actuator circuit outside the camera. The start of the next detection process is linked to the condition of whether the overlap margin signal OMS has been received, as this marks the earliest meaningful time point at which the next detection process can be started—by setting the level trigger signal LTS—namely when the reading of the last row of a row group in a region to be read begins. However, the next detection process need not start immediately after receipt of the overlap margin signal OMS, but can also be effected at a later time point. In principle, however, the start of a detection process by the setting of the signal LTS to "1" is not linked to the optional condition of receipt of an overlap margin signal OMS and can also be controlled independently thereof.

In a further embodiment of the method, after each detection process j=1, ..., J, at the beginning of the allocated read process, a read signal RS is set to "1", which is set to "0" again after the read process has been ended, as defined in method step d). Setting this signal indicates that at this time further read processes which are read through the same read cascade must not take place.

The previously described method for multi-line detection is particularly suitable in the case of the microscopic illumination of a specimen, wherein light emitted by the specimen is detected on the two-dimensional detector.

For example, the specimen can be illuminated with a multi-coloured light sheet, wherein the light to be detected is spectrally split and each of the colours used is allocated a region $R_m$ to be read on the detector, in which detection light allocated to the respective colour is detected. As a rule, the colours of the detection light to be detected differ from the colours of the light sheet as the light sheets are used as a rule to excite fluorescence in specimens, thus light is emitted at wavelengths other than those used during irradiation.

However, the specimen can also be illuminated linearly with M identically or differently coloured light lines m, with m=1, ..., M, which can be generated for example by a scanning movement. Light coming from the respective areas of the specimen which are illuminated with light of a light line—the m-th light line—is detected linearly in a region $R_m$ to be read allocated to this light line. In this way, the image acquisition time can be shortened considerably as the detection can be effected for all illumination lines simultaneously. Likewise, in the case of the previously described examination of a specimen with a multi-coloured light sheet the image acquisition time is also shortened, moreover the number of corrections required can be reduced as several colours can be detected on one sensor.

Advantageously, the number N of the rows in the row groups $G_{mj}$ can also be set variably in connection with steps a) and b). Thus the height of the row groups can be adapted for different optical conditions of the system, an aperture size—i.e. the number of rows in a row group—that can be modified over the image field can be realized via the selection of rows and pixels in the digitized image data. Aperture size and exposure time can be set independently of each other if the speed at which the illumination lines move over the image field is predefined.

The integration time for the rows of the in each case j-th row groups $G_{1j}, G_{2j}, \ldots, G_{Mj}$ can be controlled via the level trigger signal LTS as already explained above. If an illumination is used in which lines move over the specimen and a moving linear detection is also effected, a constant signal-to-noise ratio can be achieved in the image via the level trigger signal LTS even if the movement of the illumination lines is non-linear, or even if pauses are provided for a scanning movement—for example in the case of a reversal of the scanning movement or in the case of a bidirectional correction.

In a further embodiment, the level trigger signal LTS can be individualized for each of the regions $R_m$ to be read within a certain framework by modifying the level trigger signal LTS for each region $R_m$ to be read by a time constant $T_m$ predefined for the respective region, wherein the time constants $T_m$ are predefined depending on intensity differences in the illumination and/or detection. The intensity differences can originate for example in different illumination strengths for individual wavelengths, but can also be brought about by boundary conditions linked to the detection—for example vignettings in the edge areas of the detection surface. They can therefore be specified in advance within the framework of a calibration. The time constant can be positive or negative, i.e. it can extend or shorten the duration for which the level trigger signal LTS is set to "1". For example the duration of the LTS for the first region $R_1$ to be read can be predefined and $T_1=0$ can be predefined, i.e. the time constant for the first region to be read is zero. This specification is the easiest to manage with respect to actuation, but it can also be effected differently, for example by specifying an average duration of the LTS, and by the time constants, including those for the first region $R_1$ to be read, scattering around zero. In this way, for example intensity differences in the illumination lines can be compensated for.

It must be ensured that, in the case of different integration times, the periods of time in which reading takes place do not overlap for two row groups of consecutive regions to be read if for example the integration time for the first row group is shortened due to a negative time constant in the second region to be read, with the result that, without further measures, the time point of reading these rows coincides with the time point of reading the corresponding row group of the first region to be read. For this reason, after the respective integration process has been ended, the read process is not started until after the end of a delay time $t^q_m$ which is determined for each region to be read individually by the system on the basis of the integration times and time constants.

In the simplest case, both the time constant $T_m$ and the delay times $t^q_m$ are zero in each case. Where all the integration times in a region $R_m$ to be read are shortened compared with the initial setting in each case by a value $T_m$—corresponding to a negative value of $T_m$–$t^q_m$ is chosen for example such that the sum of shortened integration time and delay time $t^q_m$ corresponds to the integration time in the initial setting, thus the read process further begins at the same time, i.e. $t^q_m=|T_m|$. Where only one integration time in the region $R_m$ to be read is extended, this time for the subsequent region $R_{m+1}$ for example can be inserted between integration and read process. If e.g. $T_{m+1}=0$, $t^q_{m+1}=T_m$ would be true, to name but two examples.

The output of the signals by the actuator can of course be delayed or accelerated in order to take into account the reaction lag of corresponding hardware components. For example the illumination signal IS can be shifted forward by a defined time value in order to take into account the lag when switching a global shutter, for example an AOTF.

In a further embodiment of the method, the sequence in which integration and read processes are triggered in the rows on the detector during a detection process is reversed between two detection processes j and j+1 in each case, i.e. with respect to the position on the detector the first row $Z_{111}$ can either be the top row of all rows used, or else the bottom row. The method can thus be carried out in two directions, in particular it is also possible to change the direction of the row activation from the j-th row groups $G_{mj}$ to the next row groups $G_{mj+1}$, i.e. to allow the integration and read cascades to proceed alternately from top to bottom and from bottom to top on the detector surface, wherein the rows are to be aligned horizontally.

In a further embodiment of the method, within the framework of the image processing—either integrated internally into the camera or in an external image-processing unit—the number of the rows $Z_{mjn}$ to be taken into account in the image $B_{mj}$, with n=1, ..., N, can be set for a calculation of a row-type image $B_{mj}$ of the j-th row group $G_{mj}$ in the m-th region $R_m$ to be read. Alternatively or in combination, in the calculation of the row-type image the pixels x of each row $Z_{mjn}$ can be weighted with a weighting factor $w_{mjnx}$, wherein x denotes the horizontal position of a pixel x in the relevant row. The weighting factors $w_{mjnx}$, which can assume values between zero and one, including these limit values, are parameters which can be predefined by a user. In this way, for example it can be specified that in the edge areas—regarded horizontally—of the rows the influence of the rows of the respective row group lying vertically in the edge area is greater or less than in the case of rows in the middle area.

It is understood that the features named above and those yet to be explained below can be used not only in the stated combinations but also in other combinations or alone, without departing from the scope of the present invention.

BRIEF DESCRIPTION OF THE DRAWINGS

The invention is explained in yet more detail below by way of example with reference to the attached drawings, which also disclose features essential to the invention. There are shown in.

DETAILED DESCRIPTION OF THE DRAWINGS

Figure 1:
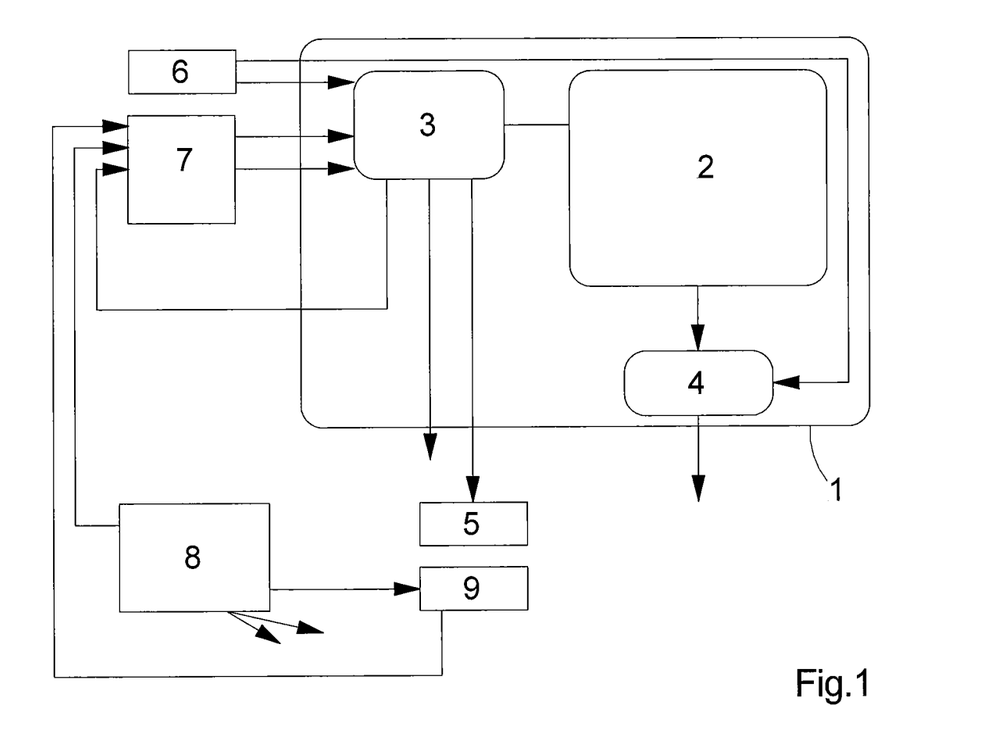
FIG. 1 is an arrangement for carrying out a multi-line detection method.

By way of example, an arrangement with which a multi-line detection can be carried out is shown in FIG. 1. The arrangement comprises a camera 1 with a detector 2, an actuator 3 and an image-processing unit 4. The detector 2 comprises the image sensor, for example a CMOS image sensor. Such a sensor comprises a number of individual rows which can be actuated individually, i.e. in which the integration time and read time can, in principle, be controlled independently of the other rows. Each detector row is composed of a number of pixels, which thus results in a two-dimensional detector. The arrangement shown in FIG. 1 is to be understood only by way of example. Arrangements in which the actuator 3 is part of the image sensor, and/or in which the image-processing unit 4 is located outside the camera 1, for example in a PC, are likewise conceivable.

A CMOS image sensor for example contains, per pixel, several transistors, which enable, among other things, the clearing of charge in the pixel, the transfer of charge to a charge-to-voltage converter, a so-called correlated double sampling (CDS) for eliminating undesired reset offset and the relaying of the detection signal voltage to a column bus. Analogue-to-digital converters which digitize the voltages are connected to the column buses. For the integration of photo charge forming under exposure and to read this charge, the rows and column buses on the image sensor must control a particular sequence of switching processes. For the digitization, further voltage curves are generated. The reading of a row comprises the total time for a transfer of the accumulated charge up to the generation of the digitized value, including delay times possibly additionally defined by the user. During a read process, a second read process which reads through the same read cascade must not be started. In the state of the art there are CMOS image sensors in which the upper and the lower sensor halves each comprise separate analogue-to-digital converters and column buses, i.e. comprise two read cascades. With such sensors, two rows can be read at the same time, wherein these must lie on different sensor halves, i.e. there are actually two sensors independent of each other. To simplify the representation, however, it is assumed here that the sensor comprises only one read cascade, but a transfer to two or more read cascades is readily possible, as the areas of the sensor can be actuated independently of each other. The generation of the row and column bus signals can be realized for example via—sufficiently low-latency and low-fluctuation—electronics, which can be designed as part of the image sensor or also as an external circuit, via separate switching circuits which feed signals to the image sensor from outside or, when a suitable sensor is used, can also be effected via a programming of the latter, for example via a downstream row decoder or via a digital control block.

The image data read on the image sensor are fed to the image-processing unit 4, which for example combines the data of the individual pixels into images and is connected to a further evaluation unit, a memory unit and/or a visual output unit. An important component of the camera 1 is the actuator 3, which contains a programmable actuator logic, among other things.

Via a parameterization interface 6, regions $R_m$ to be read on the sensor, row groups $G_{mj}$ in these regions and the number N of rows per row group, $Z_{mjn}$, can be specified by a user or automatically depending on the illumination settings and the examination method, and delivered to the actuator 3. If row-type images are to be calculated, corresponding weighting factors $w_{mjnx}$ can likewise be transmitted to the image-processing unit 4 via the parameterization interface 6.

The arrangement also comprises a trigger manager 7, which is represented here as a component outside the camera, but can also be part of the camera 1. The trigger manager 7 has the task of integrating a level trigger coming from outside into the sequence control system of the sensor device via a level trigger signal LTS and deriving from the signals of the sensor control an illumination signal IS, a read signal RS and an overlap margin signal OMS and making them available for external use, in order that these signals can be used for the synchronization of external hardware. The trigger manager can undertake further tasks in connection with the signal generation also depending on further signals, for example the trigger manager 7 can use a synchronization signal of the scanner 9 in order to determine the starting time point for the level trigger signal LTS. The trigger manager 7 can also communicate with an acousto-optic modulator (AOM/AOTF) 5, to which the illumination signal IS is transmitted in order to switch a global shutter to open, or to close it, with the result that all rows of the detector are exposed at the same time. Either via the trigger manager 7 or via a software control 8, a signal to reverse the sequence in which integration and read processes are triggered during a detection process in the rows on the detector, i.e. to reverse the shutter propagation direction, can also be specified. The read time $t^a{}_m$ of a row in a region $R_m$ to be read is also specified in the parameterization interface 6 or transmitted by this to the actuator 3. The read time consists of at least two values, $t^a{}_m = t^r{}_m + t^o{}_m$, wherein $t^r{}_m$ is the actual read time physically required for transferring the accumulated charge, including the determination of a digitized value allocated to the charge, and $t^o{}_1$ defines a user delay time which can be freely chosen by a user and with which the read process is started or ended depending on whether the user delay time is added before or after the actual reading. In the actuator logic, the parameters for the integration time, i.e. , among others, the level trigger signal LTS and the time constants $T_m$, specify the read time, the number of the respective regions or groups M, J, N, and the switching behaviour in the column and row buses. The signals OMS, RS and IS serve for latency-free control without the use of a software control. The other external devices—relating to the camer—for example a scanner 9, spatial light modulators, a microscope stage, etc. can also be controlled by means of the additional software control 8. Illumination lines or light sheets can be realized via corresponding optical structures known per se by means of scanners, cylindrical lenses, spatial light modulators or digital mirror arrays.

The sequence of a method is to be explained in more detail below with reference to FIG. 2 and FIG. 3. In both cases, in a step a) a number M of regions $R_1$, $R_2$, $R_M$ to be read is first specified on the two-dimensional detector 2, connected to the actuator 3, which comprises a number of detector rows—for example 1500 detector rows—wherein M is a natural number which is greater than or equal to 1. In connection with FIG. 2, M=3. The regions $R_1$, $R_2$, and $R_3$ here are represented directly adjacent to each other, this representation is merely for clarity, as a rule the regions $R_m$ to be read, with m=1, . . . , M, lie further apart on the sensor in order to clearly separate the optical images. In the case of typical applications, a region to be read comprises for example 400 lines.

In each region $R_m$ to be read, in a step b) a number J of row groups $G_{m1}$, $G_{m2}$, . . . , $G_{mJ}$ of in each case adjacent detector rows is specified. J is a natural number greater than or equal to 1. In the present example J is likewise equal to 3, but as a rule approximately 100 row groups per region to be read, i.e. J=100, are usual in application. Each row group $G_{mj}$ comprises a number N of detector rows $Z_{mj1}$, $Z_{mj2}$, . . . , $Z_{mjN}$. N is a natural number greater than or equal to 1 and j is a counting index which runs from 1 to J.

In the next step c), in order to start a first detection process, with j=1, a level trigger signal LTS is set from "0" to "1". An integration process is triggered for the first detector row $Z_{111}$ of the first row group $G_{11}$ in the first region $R_1$ to be read, the predefined integration time for this integration process is $t^b{}_1$. At the end of the integration time the level trigger signal LTS is set from "1" to "0" again, the integration process for the first detector row $Z_{111}$ and the first detection process are ended. The signal curve is represented over time tin the upper part of FIG. 2. The signal curve is here represented simplified as a rectangular signal for all signals. A value of 1 corresponds to a high voltage value ("high"), a value of 0 corresponds to a low value ("low"). In the lower part of FIG. 2 the sensor rows are represented along the y-axis and the x-axis corresponds to the time axis. It is thus shown how the actuator circuit actuates the individual rows over time. Each row occupies the space along the y-axis which corresponds to the height of one of the rectangles. Empty areas in the rectangles correspond to integration processes and the filled-in areas correspond to the read processes explained below.

Once the first detection process has been ended, a read process is started, wherein during a first read time $t^a{}_1$ the exposure value detected for this detector row $Z_{111}$—corresponding to the recorded photo charge—is read and conveyed to an evaluation unit. The first read time $t^a{}_1$ thus corresponds to the width of the filled-in area in the rectangle allocated to the detector row $Z_{111}$ on the time axis. In total J detection processes are completed and a different integration time $t^b{}_j$ and/or a different read time $t^a{}_j$ can be chosen for each of these detection processes.

Figure 2:
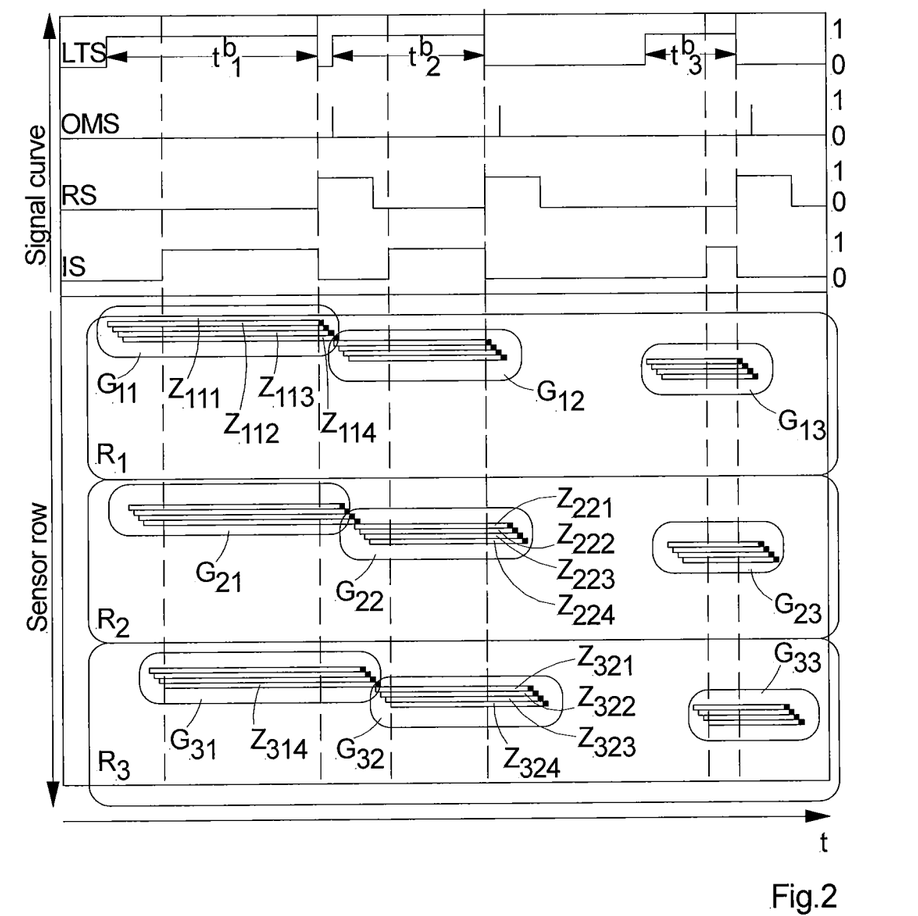
FIG. 2 is the typical sequence of such a method.

In a step d), in the first alternative shown in FIG. 2, by means of the actuator logic integrated into the actuator 3, integration processes with subsequent reading are then triggered successively, temporally offset in each case by the distance of the first read time $t^a{}_1$ in the further detector rows of the first row group $G_{11}$ and then in the corresponding first row groups $G_{m1}$ of the remaining regions $R_m$ to be read. The read process is ended after the last row $Z_{M1N}$ of the first row group $G_{M1}$ of the last region $R_M$ to be read has been read, in the example this is the row $Z_{114}$.

Depending on the control system and the hardware used it is alternatively also possible in step d) to shorten or completely avoid this period in which the integration processes are started by triggering the integration processes at least almost simultaneously with the starting of the first detection process in the further detector rows of the first row group ($G_{11}$) and the further first row groups ($G_{m1}$) of the remaining regions ($R_m$) to be read for m−1=1, . . . , M−1. This increases the efficiency of the exposure, as the period of time in which all rows in the respective detection process are switched to integration can be extended. This second alternative is represented in FIG. 3.

In a step e), after the last integration process of the first row group $G_{11}$ in the first region $R_1$ to be read has been ended, J−1 further detection and read processes are started successively by carrying out steps c) and d) for the further row groups $G_{mj}$, with j−1=1, . . . , J−1, with further integration times $t^b{}_j$ and further read times $t^a{}_j$. The time points at which the detection processes are to be started are predefined by the application, i.e. from outside via the signal LTS.

At the start of each read process a read signal RS is set to "1", which is set to "0" again after the read process has been ended, only then can a situation be again created in which an integration process can proceed for all participating rows. An exposure of the detector is to be effected only when an integration process is actually proceeding in all participating rows, in the example shown in FIG. 2 this is signalled with the illumination signal IS, which is set to "1" when all rows have been actively switched to integration. As soon as this is no longer the case and the integration process is ended for the first—in the mentioned example in each case the top—row and a read process is started, the illumination signal IS, simultaneously with the level trigger signal LTS, is set to "0" again. With the illumination signal IS, for example, the acousto-optic modulator 5 can be controlled, wherein its lag during the opening of the global shutter is preferably taken into consideration by transmitting the illumination signal IS to the acousto-optic modulator 5 in advance to a certain degree. An exposure of the two-dimensional detector is only effected while the illumination signal IS is set to "1". The next detection process, thus the (j+1)-th detection process, after the j-th detection process, is not started until the integration process for the last row $Z_{1jN}$ of the first row group $G_{1j}$ of the first region $R_1$ to be read has been completed in the j-th detection process. When this integration process is completed, an overlap margin signal OMS is transmitted to the actuator circuit, to be seen on the line perpendicular to the axis for the overlap margin signal OMS in FIG. 2 and FIG. 3, which indicates that the OMS has there been set to "1". The next detection process should preferably be started only when the overlap margin signal OMS has been received, but this is not compulsory. In the example shown in FIG. 2, the detection process for j=2 directly follows on from the first detection process j=1. However, there is a longer period of time between the second and third detection process.

Figure 3:
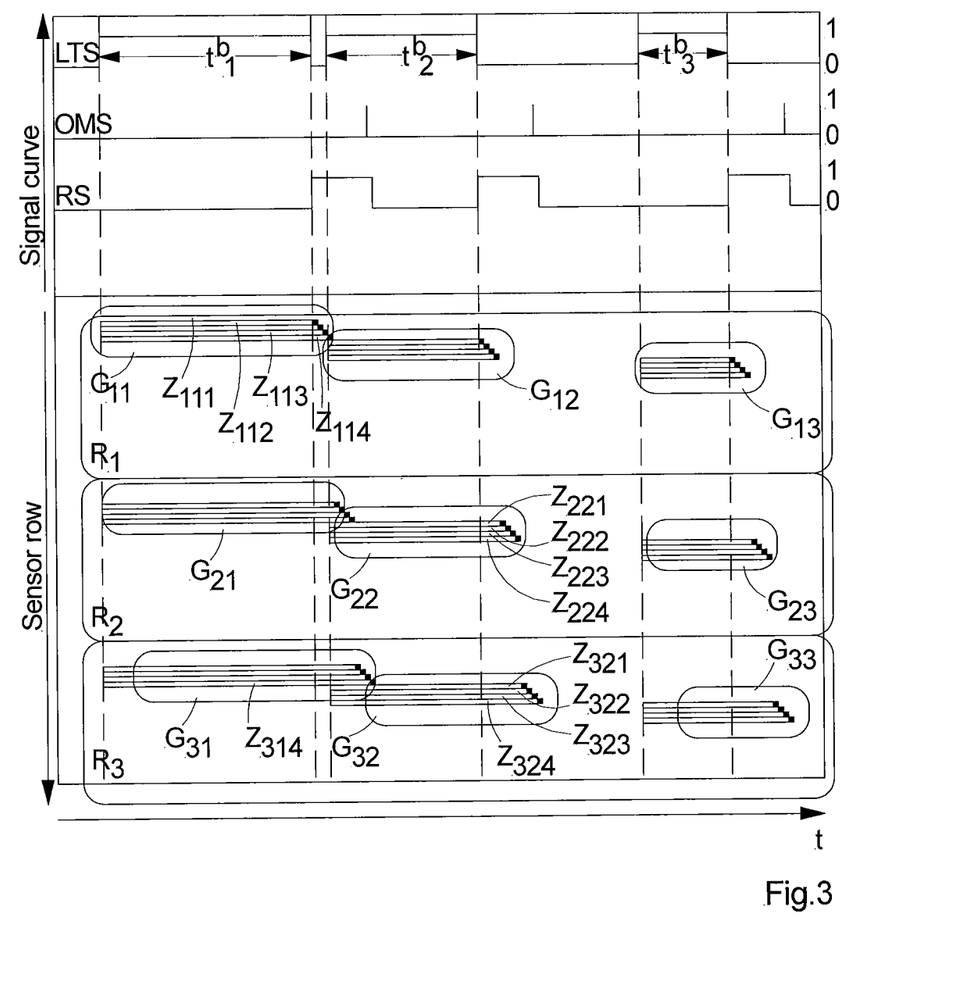
FIG. 3 is an alternative sequence of this method.

In the alternative example shown in FIG. 3, the illumination signal IS corresponds to the level trigger signal LTS, therefore a separate signal IS can be dispensed with and the exposure can be coupled to the signal LTS. The signal OMS can be set analogously to the manner shown in FIG. 2, but here it is set—even when it is disregarded—such that it marks the start of the read process of the last row $Z_{1MN}$ of the first row group $G_{Mj}$ of the last region $R_N$ to be read, with the result that integration processes of different regions would not overlap in the same areas.

The length of the integration times in relation to the read times influences the length of the period of time in which the detector can be exposed, as the exposure time actually available is always shorter than the actual integration time, because of the temporal offset during integration and reading. In the third detection process j=3 in FIG. 2 and FIG. 3, a substantially shorter integration time $t^b_3$ was chosen, the exposure time actually available is here substantially shorter than for example in the case of the first detection process with j=1 and is only approximately one third of the entire integration time. This relationship can be improved again by shortening the read time or extending the integration time. The actually usable exposure time for the integration of photo charge is also denoted by the perpendicular, dashed lines, the relationship of the actual usable exposure time to the integration time corresponds to the relationship of the duration of the illumination signal IS to the level trigger signal LTS. With longer read times, i.e. here with longer $t^R_m$ at optionally lower clock rates, better noise properties can be realized in the detector, which impair the relationship of the duration of the level trigger to the illumination trigger, however.

The method for multi-line detection is suitable for example for those methods in which a linear detection and/or a linear illumination is used, for example for light-sheet microscopy methods with multi-coloured light sheets in which the light is detected perpendicular to the light sheet plane.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

LIST OF REFERENCE NUMBERS

1 camera
2 detector
3 actuator
4 image-processing unit
5 acousto-optic modulator
6 parameterization interface
7 trigger manager
8 software control
9 scanner

What is claimed is:

1. Method for multi-line detection, in which
   a) specifying on a two dimensional detector a number M of regions to be read, with M≥1, said detector connected to an actuator, with a number of detector rows, wherein each region to be read comprises at least one detector row,
   b) in each region to be read, with m=1, . . . , M, a number J of row groups, with J≥1, in each case of adjacent detector rows is specified, wherein each row group comprises a number N of detector rows, with j=1, . . . , J and N≥1, with at least one M or J greater than 1,
   c) setting a level trigger signal (LTS) from "0" to "1" in order to start a first detection process, with j=1, whereby an integration process is triggered for the first detector row of the first row group in the first region to be read during a first integration time, at the end of which the level trigger signal is set from "1" to "0", the integration process and the first detection process being ended and a read process is started, wherein during a first read time the exposure value detected for this detector row is read and conveyed to an evaluation unit,
   d) wherein by means of an actuator logic integration processes with subsequent reading are triggered successively, temporally offset in each case by the distance of the first read time in the further detector rows of the first row group and then correspondingly in the first line groups of the remaining regions to be read for m−1=1, . . . , M−1, or at least almost simultaneously with the starting of the first detection process in the further detector rows of the first row group and the further first row groups of the remaining regions to be read for m−1=1, . . . , M−1, wherein the read process is ended once the last row of the first row group of the last region to be read has been read,
   e) after the last integration process of the first row group in the first region to be read has been ended, J−1 further detection and read processes are started successively by carrying out steps c) and d) for the further row groups, with j−1=1, . . . , J−1, and with further integration times and further read times.

2. Method according to claim 1, wherein an exposure of the detector is effected during the integration time in each detection process for j=1, . . . , J only when an integration process proceeds at the same time for the rows of all participating row groups.

3. Method according to claim 2, wherein in each detection process j for j=1, . . . , J the exposure is controlled by means of an illumination signal (IS) which is set to "1" during the respective detection process for a row when the integration process is started for the last detector row of the corresponding row group of the last region to be read, and the illumination signal (IS) is set to "0" simultaneously with the level trigger signal (LTS), wherein an exposure of the two-dimensional detector is only effected while the illumination signal is set to "1".

4. Method according to claim 1, wherein the subsequent detection process is not started until, in the immediately preceding detection process, the integration process for the last row of the first row group of the first region to be read has been completed.

5. Method according to claim 4, wherein in each detection process j=1, . . . , J, when the integration process has been completed for the last row of the first row group of the first region to be read, an overlap margin signal (OMS) is transmitted to the actuator circuit, and the start of the next detection process is linked to the condition of whether the overlap margin signal (OMS) has been received.

6. Method according to claim 1, wherein after each detection process j=1, . . . , J, at the beginning of the allocated read process, a read signal (RS) is set to "1", which is set to "0" again after the read process has been ended.

7. Method according to claim 1, wherein a specimen is microscopically illuminated and light emitted by the specimen is detected on the two-dimensional detector.

8. Method according to claim 7, wherein the specimen is illuminated with a multi-coloured light sheet, the light to be detected is spectrally split and each of the colours used is allocated a region to be read, in which detection light allocated to this colour is detected.

9. Method according to claim 7, wherein the specimen is illuminated linearly with M light lines and light coming from a respective area of the specimen which has been illuminated with light of the m-th light line is detected linearly in a region to be read allocated to this light line.

10. Method according to claim 7, wherein the level trigger signal (LTS) is modified for each region to be read by a time constant predefined for the respective region, wherein the time constants are predefined depending on intensity differences in the illumination and/or detection.

11. Method according to claim 1, wherein the sequence in which integration and read processes are triggered in the rows on the detector during a detection process is reversed between two detection processes j and j+1 in each case.

12. Method according to claim 1, wherein the number N of the rows in the row groups can be set variably.

13. Method according to claim 1, wherein in the case of an image processing the number of the rows $Z_{mjn}$ to be taken into account in the image $B_{mj}$, with n=1, . . . , N, can be set for a calculation of a row-type image $B_{mj}$ of the j-th row group $G_{mj}$ in the m-th region $R_m$ to be read and/or each pixel x of each row $Z_{mjn}$ is weighted with a weighting factor $w_{mjnx}$ in the calculation.

* * * * *

UNITED STATES PATENT AND TRADEMARK OFFICE
CERTIFICATE OF CORRECTION

PATENT NO. : 10,567,681 B2  
APPLICATION NO. : 15/580417  
DATED : February 18, 2020  
INVENTOR(S) : Martin Beck Page 1 of 1

It is certified that error appears in the above-identified patent and that said Letters Patent is hereby corrected as shown below:

In the Specification

Column 2, Line 40     now reads: "J of row groups $G_{m1}$, $G_{m2}$, $G_{mJ}$, with a natural number J≥1," should read --J of row groups $G_{m1}$, $G_{m2}$, . . . , $G_{mJ}$, with a natural number J≥1,--

Column 3, Line 39     now reads: "integration times $t^b_1$ and further read times $t^a_j$. At the start," should read --integration times $t^b_j$ and further read times $t^a_j$. At the start,--

Column 4, Line 43     now reads: "j-th row group $G_m$ of the last region $R_M$ to be read. The" should read --j-th row group $G_{Mj}$ of the last region $R_M$ to be read. The--

Column 9, Line 29     now reads: "the camer - for example a scanner 9, spatial light modula-" should read --the camera - for example a scanner 9, spatial light modula- --

Column 9, Line 37     now reads: "cases, in a step a) a number M of regions $R_1$, $R_2$, $R_M$ to be" should read --cases, in a step a) a number M of regions $R_1$, $R_2$, . . . , $R_M$ to be--

Column 9, Line 67     now reads: "over time tin the upper part of FIG. 2. The signal curve is" should read --over time t in the upper part of FIG. 2. The signal curve is--

Signed and Sealed this  
Eighteenth Day of August, 2020

Andrei Iancu  
*Director of the United States Patent and Trademark Office*